United States Patent
Shapiro

(10) Patent No.: US 7,654,101 B2
(45) Date of Patent: Feb. 2, 2010

(54) SPLIT-AIR STREAM AIR CONDITIONING WITH DESICCANT DEHUMIDIFICATION

(76) Inventor: Ian M. Shapiro, 4088 Garrett Rd., Ithaca, NY (US) 14850

(*) Notice: Subject to any disclaimer, the term of this patent is extended or adjusted under 35 U.S.C. 154(b) by 236 days.

(21) Appl. No.: 11/952,157

(22) Filed: Dec. 7, 2007

(65) Prior Publication Data
US 2009/0145140 A1  Jun. 11, 2009

(51) Int. Cl.
  *F25D 17/06*  (2006.01)
(52) U.S. Cl. .............. 62/260; 62/271; 62/93; 62/94; 165/45
(58) Field of Classification Search ........... 62/91–93, 62/260, 271, 332–333
See application file for complete search history.

(56) References Cited

U.S. PATENT DOCUMENTS

| | | | |
|---|---|---|---|
| 3,009,684 A | | 11/1961 | Munters |
| 3,488,971 A | * | 1/1970 | Meckler ............ 62/3.2 |
| 4,113,004 A | | 9/1978 | Rush et al. |
| 4,180,985 A | | 1/1980 | Northrup, Jr. |
| 4,474,021 A | | 10/1984 | Harband |
| 4,926,618 A | | 5/1990 | Ratliff |
| 5,325,676 A | | 7/1994 | Meckler |
| 5,667,560 A | * | 9/1997 | Dunne ............ 95/113 |
| 5,890,372 A | * | 4/1999 | Belding et al. ........ 62/271 |
| 6,739,142 B2 | | 5/2004 | Korin |
| 6,918,263 B2 | | 7/2005 | Lee et al. |
| 7,047,751 B2 | | 5/2006 | Dinnage et al. |
| 7,188,480 B2 | | 3/2007 | Korin |
| 7,338,548 B2 | * | 3/2008 | Boutall ............ 95/14 |
| 2005/0262862 A1 | | 12/2005 | Moffitt |
| 2007/0079623 A1 | | 4/2007 | Inaba et al. |

FOREIGN PATENT DOCUMENTS

| | | |
|---|---|---|
| DE | 10330139 | 1/2004 |
| JP | 06313632 | 11/1994 |

* cited by examiner

*Primary Examiner*—Cheryl J Tyler
*Assistant Examiner*—Lakiya Rogers
(74) *Attorney, Agent, or Firm*—Bernhard P. Molldrem, Jr.

(57) ABSTRACT

A geothermal desiccant cycle cools and dehumidifies the air in an indoor conditioned space. The return air is split into two streams. One of the streams passes through a desiccant wheel to remove water vapor and then through a cooling coil for sensible cooling from geothermal water. The other stream is heated to increase its capacity to absorb moisture, and then is passed through the desiccant wheel to pick up the moisture transferred from the first stream and regenerate the desiccant. The second air stream, which now has a higher dewpoint temperature, flows through a geothermal cooling coil, for sensible cooling as well as condensation of the moisture. The two air streams are mixed and supplied back to the conditioned space. A regenerative air-air heat exchanger can be used to recover some of the heat used in heating the second air stream.

18 Claims, 4 Drawing Sheets

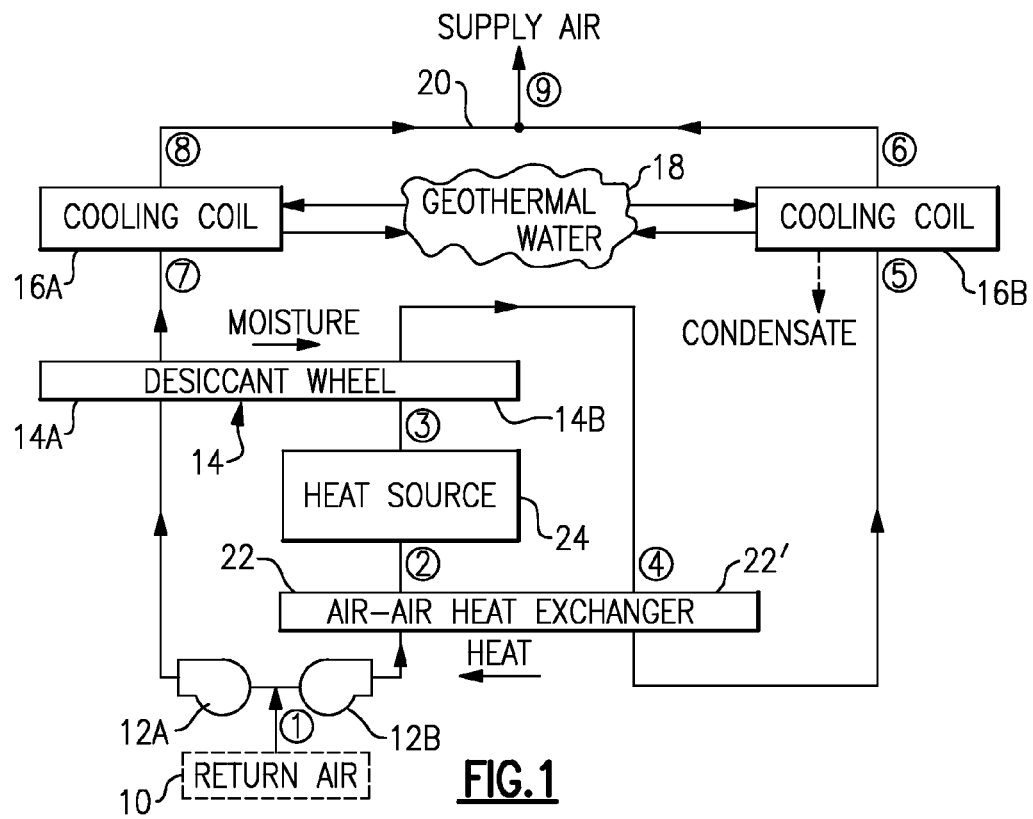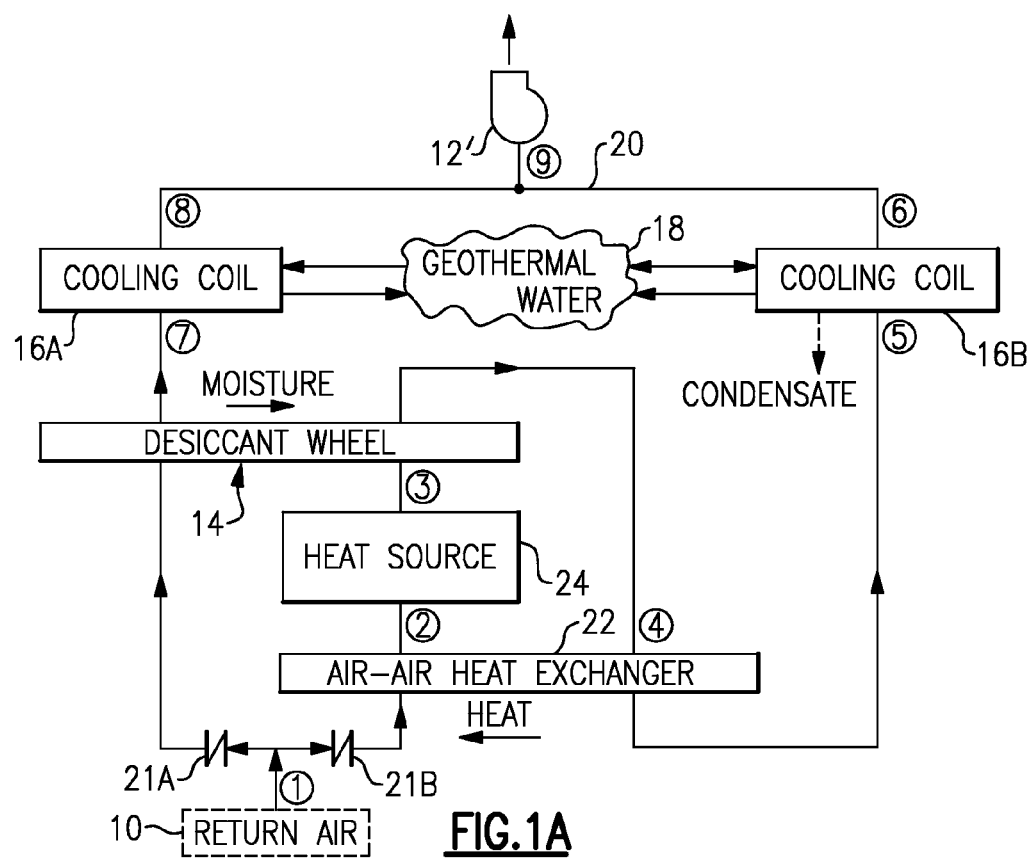

SPLIT-AIR STREAM AIR CONDITIONING WITH DESICCANT DEHUMIDIFICATION

BACKGROUND OF THE INVENTION

This invention relates to geothermal heating and cooling, and is more particularly concerned with a closed system in which geothermal water is used for removing sensible heat from indoor air, and a desiccant wheel is employed for removing humidity. The invention is more specifically directed to a geothermal air conditioning system in which the air stream is split into first and second air streams or courses, for removing both heat and humidity.

Abundant cooling resources are available from the earth in the form of geothermal cooling, which does not require significant energy to obtain, and which does not result in discharge of waste heat into the atmosphere. Geothermal cooling can be obtained by circulating water (or another heat exchange medium) through pipes that run to and from one or more geothermal wells. Because the ground temperature is constantly cooler than the temperature required for indoor air, geothermal sensible cooling appears to be an attractive option. However, in most parts of the U.S., the temperature of geothermal water coming from the geothermal well is not cold enough for dehumidification or latent cooling. In New York State, the deep earth temperature ranges between 46° F. in the Adirondacks and St. Lawrence valley, in the north part of the state, and 54° F. in the New York City area, and averaging about 50° F. statewide. Most other northern states have similar ground temperature conditions. Geothermal cooling can be used for "free" cooling of air, but the water being circulated is not cold enough, by itself, for dehumidification. The dewpoint of indoor air at 80° F. dry-bulb temperature and 67° F. wet-bulb temperature is about 60° F. The water circulated to deep earth temperatures of 46° to 54° F. will not return to the surface cold enough to dehumidify air with a dewpoint of 60° F.

Desiccant dehumidification has been employed for many applications, relying on indoor air passing through a dry side of a desiccant wheel to transfer moisture from the air to desiccant material, and then passing heated air through a wet side, where the wheel has rotated, to remove the moisture so it can be discharged somehow. Typically, outdoor air is heated and passed through the desiccant wheel, and the air leaving the desiccant wheel is discharged back into the outside environment. Traditional desiccant-based systems, i.e., "ventilation-cycle" systems, have a fairly low cooling and dehumidification efficiency, which may be between only about 0.6 COP. It is desired to raise this efficiency, and if possible to achieve 1.0 COP or higher.

OBJECTS AND SUMMARY OF THE INVENTION

Accordingly, it is an object of the invention to provide a geothermal air conditioning system that also dehumidifies the indoor air, and achieves higher efficiency (and reduced cost of cooling and dehumidification) than is achieved in the prior art.

It is another object to provide a split-airstream geothermal system that employs both geothermal cooling and desiccant dehumidification, to cool the indoor air and also to condense moisture in the indoor air without discharge of waste heat or humidity to the outside environment.

It is also an object to provide a system that consumes less power in terms of parasitic energy than do traditional air conditioning systems such as compression cycle systems, absorption systems, or desiccant-ventilation air conditioning systems.

It is a further object to facilitate enhanced humidity control of the indoor air, and to allow integrated high-efficiency heating by use of the same system.

According to an aspect of this invention, the problem of cooling and dehumidifying the air with water from a source of natural cooling, e.g., geothermal water (at temperatures of about 50° to 60° F.), is achieved by splitting the air stream at the intake or return conduit into first and second air streams or courses. The air flowing along one of the courses passes through a desiccant wheel to remove the humidity, and then the air leaving the desiccant wheel passes through a geothermally cooled heat exchanger coil to remove the sensible heat. The air flowing on the other course is heated and then passes through the desiccant wheel to pick up the moisture that had been stripped from the air in the first course or air stream. Then the air leaving the desiccant wheel, which has a much higher dewpoint temperature, can be easily dehumidified in a geothermally cooled coil. An attractive option is a regenerative air-air heat exchanger that can transfer heat from the air leaving the desiccant wheel to the air that is entering the heater element, which boosts the system efficiency. The air leaving the cooling coil then passes to the supply plenum where it is blended with the air from the first course or air stream, and this conditioned air is then supplied back into the conditioned indoor comfort space. Aside from the energy needed to heat the second course air stream, some energy is needed to pump the water to and from the geothermal well, and to run the blower or blowers. The air conditioning system can achieve an efficiency of 1.2 COP or higher. There is no consumption of water, as is the case in traditional ventilation-type desiccant air conditioning cycle systems.

In a preferred embodiment, the geothermal air-conditioning and dehumidification arrangement of this invention receives the room air from the conditioned space at a return duct, directs the air in separate first and second airstreams or courses, and then discharges the conditioned air from a supply plenum back into the conditioned space enters. The arrangement employs a desiccant device, such as a desiccant wheel, an air-to-air heat exchanger in which air in a first pathway exchanges thermal energy with air in a second pathway, a heating element, and first and second cooling coils for cooling the air, these coils being supplied with water from, e.g., a geothermal well. There would typically be a blower or blowers for forcing or drawing the air through the first and second courses, as well as air filters and other ancillary equipment.

The return air entering via the return air duct is divided and directed into the separate first and second air stream courses.

In the first course or air stream, the return air passes through the desiccant wheel to remove humidity from the air; then the air leaving the desiccant wheel passes through the first cooling coil to cool the air; and the air leaving the first cooling coil enters the supply air plenum.

In the second course or air stream, the return air enters the first pathway of the air-to-air heat exchanger, and the air leaving that first pathway is heated by the heater element, and then passes through the desiccant wheel. There the air stream picks up, from the desiccant wheel, the moisture that had been removed from the first course or first air stream. The air leaving the desiccant wheel passes through the second pathway of the air-to-air heat exchanger, where it gives off heat to the incoming air from the return duct. The air leaving the second pathway of the air-to-air heat exchanger passes through the second cooling coil. The second cooling coil removes heat from this air stream, and also condenses the moisture that has been picked up from the desiccant wheel, both cooling and dehumidifying the air stream in the second course. Then the air exiting the second cooling coil passes to the supply air plenum where it mixes with the air of the first course or airstream. Then the combined air streams are supplied back to the conditioned comfort space.

This split-airstream system is especially effective where water supplied from the geothermal well is between about 50° F. and 60° F., i.e., where the water returning from the geothermal well is too warm for dehumidification, but cool enough for sensible cooling of the indoor air.

Preferably, the regenerative air-to-air heat exchanger can be a counterflow heat exchanger, or alternatively this may be constituted as a cross-flow heat exchanger.

Also, there can be separate first and second blowers situated at a return duct for moving air respectively through said first and second courses. These blowers can be independently controlled, so that the respective air flows can be optimized for indoor air conditions and geothermal water temperatures. The system can also be configured with a blower at the supply plenum to draw the air through the two courses. In that case there may be first and second dampers at the return side for the first and second courses, and these may also be independently controlled.

In order to allow for warmer geothermal temperatures that may occur in late summer, A supplemental chiller can be incorporated for removing some of the heat from water supplied from the geothermal well. This keeps the water that flows through the cooling coils in the desired temperature range. In that case, the supplemental chiller can be configured to transfer heat from the water supplied from the geothermal well to the water that returns to the geothermal well, rather than discharge waste heat to the ambient air. This supplemental chiller may be thermostatically controlled based on return groundwater temperatures.

Because there is no outdoor heat exchanger coil and no outdoor fan, there is a considerable savings in terms of hardware and in terms of energy for moving the outdoor air through an outdoor coil.

Also, the terms "geothermal" and "geothermal water" as used in the context of this invention should not be limited only to water circulated to and from a geothermal well, but could comprise other sources of natural cooling, such as surface water from lakes or rivers, or water that has been cooled and then stored in a reservoir for use in cooling indoor air.

The above and many other objects, features, and advantages of this invention will become apparent to persons skilled in the art from the ensuing description of a preferred embodiment, which should be considered in connection with the accompanying Drawing.

BRIEF DESCRIPTION OF THE DRAWING

FIG. 1 is a schematic view of a split-airstream geothermal air conditioning and dehumidification arrangement, according to one embodiment of the invention.

FIG. 1A is a schematic view of an alternative arrangement.

DETAILED DESCRIPTION OF A PREFERRED EMBODIMENT

Figure 2:
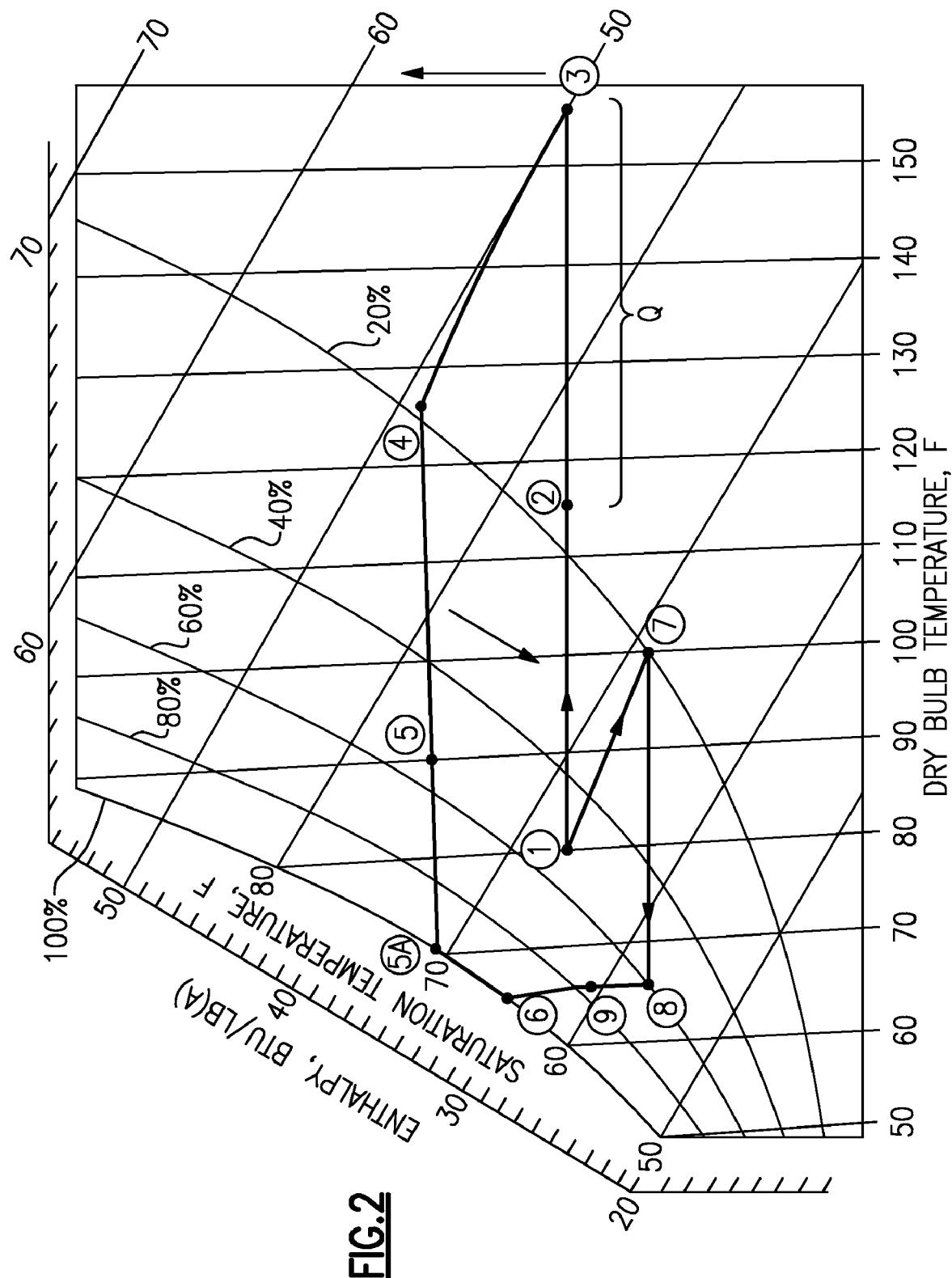
FIG. 2 is a psychrometric chart or heat flow chart for explaining the principles involved in this embodiment.

With reference to the Drawing, a geothermal and desiccant cycle air conditioning and dehumidification arrangement is shown schematically in FIG. 1. At the bottom of the drawing view, a return air duct or inlet 10 receives the warm and moist air from the room or conditioned space. The air is split into first and second air flows or courses, with a pair of blowers or fans 12A and 12B moving the air respectively along the first and second courses. The first air stream or course is shown at the left. This air stream first passes through a desiccant wheel 14, namely, through the dehumidification or drying side 14A thereof, where the desiccant materials in the wheel pick up moisture from this first air stream. The wheel 14 is rotated to convey the moisture to the second air stream where that air is heated and passes through the rotated or wet side 14B to pick up the moisture from the desiccant. This will be discussed later. The dehumidified first course air stream leaving the desiccant wheel then passes through a cooling coil 16A, to accomplish sensible cooling of the air. This air is cooled to a temperature below the temperature of the room air, and is sent to a supply air plenum 20, from which the air passes back into the conditioned space as cooled and dehumidified air.

The second course or airstream is shown to the right in this view. The second fan 12B moves the second airstream through an incoming air side of an air-to-air heat exchanger 22. This is a regenerative heat exchanger stage, and the air passing through the incoming air side is heated by air passing through the return or discharge side 22' thereof, and in turn cools the air on that side. The air leaving the incoming side of this heat exchanger then is heated by a heater element 24 to a temperature sufficient for picking up moisture from the desiccant wheel 14, and this heated air then is passed through the wet side 14B of the desiccant wheel 14. The air leaving the desiccant wheel passes through the return side 22' of the heat exchanger 22, so that some of the heat from the heater element 24 can be recovered and transferred to the incoming air. This also cools the air stream before it leaves the heat exchanger and passes through a second cooling coil 16B. The second cooling coil removes heat from the second airstream cooling this air and also condenses and removes the humidity that had been transferred to it from the first air stream by the desiccant wheel. Then the air leaving the cooling coil 16B passes to the supply plenum 20, where it mixes with the air from the first airstream and flows back to the conditioned space as cooled and dehumidified air.

In this embodiment, both the cooling coils 16A and 16B are supplied with water that has been returned from a geothermal well 18, where the water temperature is in the vicinity of 50° F. to 60° F. As discussed before, this water is sufficiently cold for sensible cooling of the air, but is not cold enough, by itself, for dehumidification of the room air. However, by splitting the air flow into first and second air streams or courses, and passing each one through the desiccant wheel and the cooling coils in this manner, it is possible to achieve both cooling and dehumidification.

An alternative arrangement is shown in FIG. 1A, in which elements that were discussed in respect to FIG. 1 are identified with the same reference numbers, and a detailed description is omitted. In this alternative arrangement, there is a single fan or blower 12' disposed at, or after, the supply plenum 20 to draw the two airstreams through the first and second courses. At the beginning of the two airstreams, i.e., at the return duct 10, are first and second dampers 21A and 21B. These can be independently controlled by means of damper motors and control circuitry (not shown) to maintain a balance of air flow along the first and second courses.

The principles of operation of this invention can be explained with reference to the diagram of FIG. 2, in which the circled numbers ① to ⑨, which appear also in FIG. 1, represent the points where the respective airflows leave one stage and enter another. In FIG. 2, the dry bulb temperature or sensible temperature is shown along the ordinate, enthalpy is shown on the scale along the left and top, the diagonal lines here are lines of constant wet-bulb temperature, and the curved lines are lines of constant relative humidity, with the saturation curve (100%) being at the upper left. The first air flow, between the return air duct and supply plenum, is represented at the lines running from point 1 to points 7, 8, and 9, and the second air flow is represented from point 1, to points 2, 3, 4, 5, 6, and 9. A knee in this second air flow line represented at point 5A is where the second air flow cools to saturation and condensation begins.

Heating of moist air, occurring at constant humidity content, occurs at process 1-2 (through the regenerative heat exchanger 22) and then at process 2-3 where heater element 24 adds a quantity Q of thermal energy. Transfer of moisture from one air stream to the other occurs at process 1-7, where the desiccant wheel 14 picks up moisture from the first air stream, and then at process 3-4, where the second air stream picks up the moisture from the desiccant wheel. There is sensible heat transfer of the incoming air in the second stream to the air leaving the desiccant wheel 14 represented at processes 1-2 and 4-5, where process 4-5 gives up heat to process 1-2. This process occurs along lines of constant moisture content. The process is intended to increase energy efficiency, i.e., to recover at least some of the heat Q from the process 2-3. The process 5-6, i.e., the passage of the air of the second stream through the geothermally supplied cooling coil 16B has two phases, in a first process 5-5A the air stream is cooled at constant humidity content until it reaches saturation (point 5A), and then in process 5A-6, the air stream cooling follows the saturation curve, where condensation also takes place, to remove the humidity that has been picked up from the desiccant wheel.

As the air passes through the desiccant wheel 14, the dehumidification process 1-7 warms the air as the desiccant material absorbs its moisture. When the air stream in the second course passes through the desiccant wheel 14, the process 3-4 cools the air as the desiccant material gives up its moisture to the warmer air stream.

In the first air stream or first course, the desiccant wheel 14 removes humidity (process 1-7) and then the air temperature is reduced (process 7-8) as the air stream passes through the geothermal cooling coil 16A.

Processes 6-9 and 8-9 represent the conditioned air from each airstream entering the supply plenum 20, and mixing before being discharged back into the conditioned space.

Figure 3:
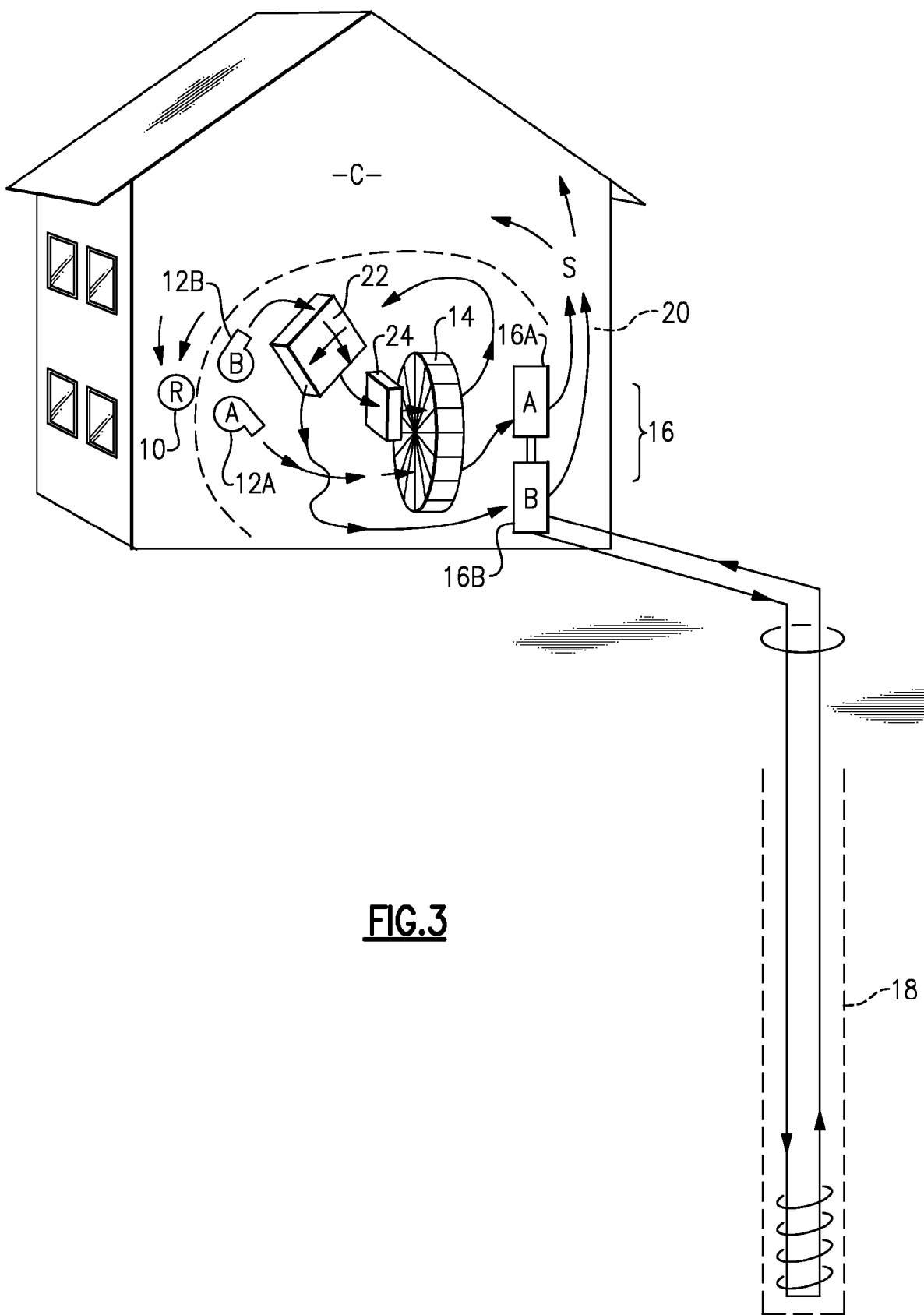
FIG. 3 is a schematic for explaining the general configuration of an installation employing the embodiment of FIG. 1.

FIG. 3 shows schematically an application of the geothermal air conditioning and dehumidification system of this invention, within a conditioned comfort space C. A geothermal well 18 can be located at, or within some distance of the dwelling or other building, and can be closed loop or open loop, of any of a variety of configurations. Here, the return air duct 10, blowers or fans 12A, 12B (the alternative configuration of FIG. 1A could be used here instead), desiccant wheel 14, cooling coils 16, air-to-air heat exchanger 22 and heater element 24 are shown somewhat representationally. Internal baffles, motors, filters, and controls are omitted in this view. Also, one or more pumps may be employed to circulate water to and from the geothermal well, but such are also omitted in this view. The heat exchanger 22 may be crossflow or counterflow, and may be rotary or plate types, for example. The two cooling coils 16A and 16B can be entirely separate coils, or can be two sides of the same cooling coil.

In some cases, to simplify the design, the regenerative heat exchanger 22 can be omitted. Additional processing, e.g., filtration, exposure of the plenum air to UV radiation, and other steps can be taken to improve the quality and healthiness of the supply air that is sent back into the conditioned space. Also, while a desiccant wheel, in which solid desiccant material is rotated for dehumidification and regeneration, is preferred, it is possible to employ other types of desiccant devices to transfer the humidity from the air stream of the first course to that of the second course. For example, liquid desiccant dehumidifiers are known, and could be employed in appropriate circumstances.

Figure 4:
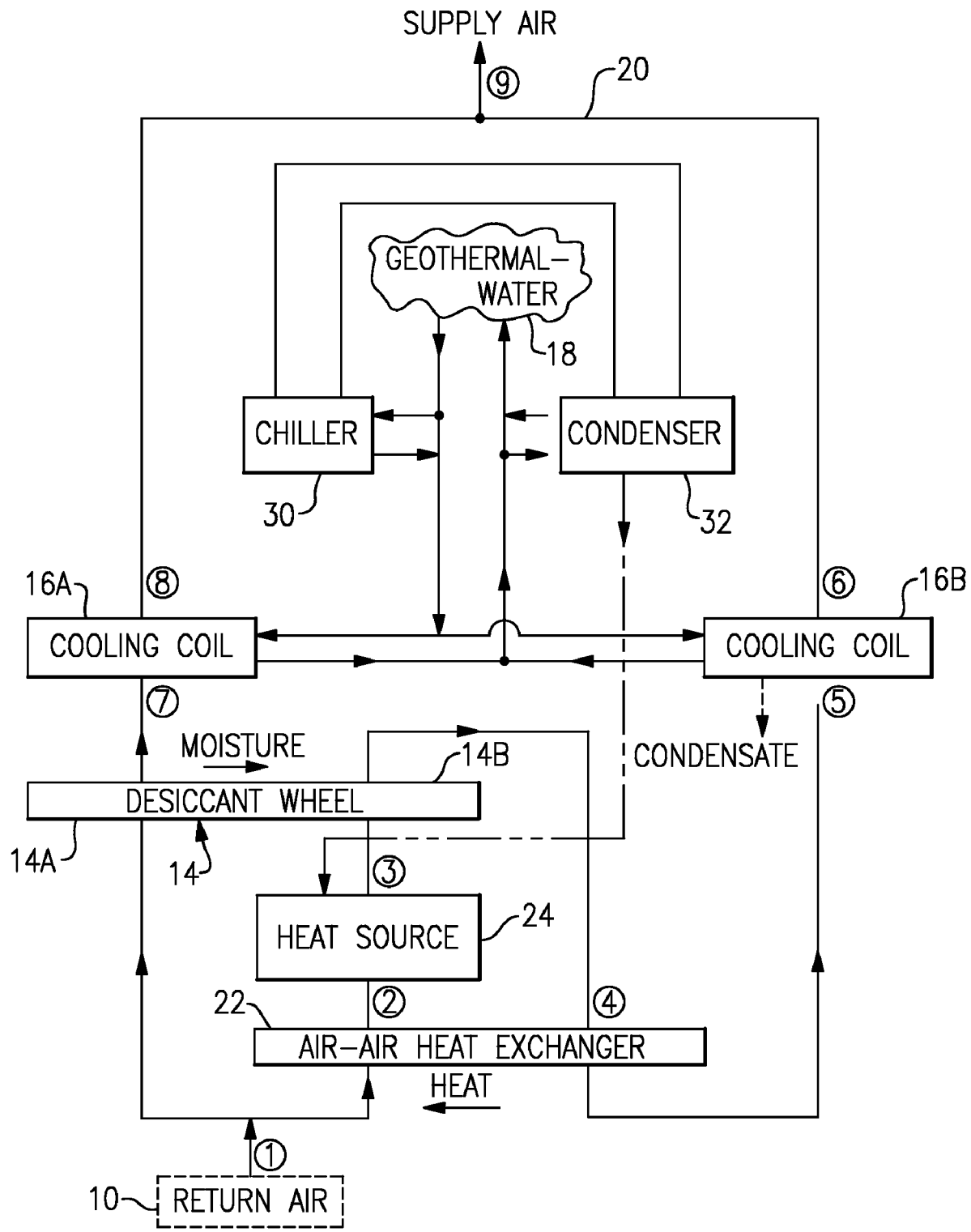
FIG. 4 is a schematic view of an alternative embodiment of this invention, with supplemental chilling of the circulating geothermal water.

FIG. 4 illustrates one possible alternative arrangement of this invention. Here, elements that are shown also in the embodiment of FIG. 1 are identified with the same reference numbers, and the detailed description will not be repeated.

An optional chiller is shown here schematically, with a chiller unit 30 for chilling the water returning from the geothermal well 18 prior to feeding it to the cooling coils 16A, 16B, and a condenser unit 32 that exhausts heat to the water returning to the geothermal well. The chiller option is used when the water from the geothermal well rises in temperature somewhat above the maximum useful temperature, i.e., above 60° F. This may occur in some locations, especially in the late summer. By extracting heat from the geothermally cooled water and exhausting it to the returning water, the system can operate more efficiently, by rejecting heat into the relatively cooler water (e.g., up to about 70° F.), and avoiding having to discharge the exhaust heat into the much warmer ambient outside air (e.g., 80° to 95° F.). The chiller can use a compression-condensation-evaporation cycle, although other types of cooling can be used for this. As is also shown diagrammatically here, some of the heat extracted by the chiller and discharged from the condenser unit 32 can be used in the heating element 24. In some environments, the supplemental chiller could be used in connection with a cooling tower, rather than rejecting the heat into the geothermal well field. This would still be an energy savings over traditional systems, as the auxiliary or supplemental chiller would be needed only to assist in dehumidification.

Heat from various blower motors, pump motors, etc., could also be used to supplement the heater element 24 to boost system efficiency and to take advantage of heat lost from these motors. Many types of heat sources exist that could be employed at the heater element stage, such as fossil fuel systems (gas- or oil-fired heat), solar thermal heat, and process waste heat. Solar energy can be quite attractive here, because of the relatively low temperature needed (e.g., below about 150° F.) for desiccant regeneration.

Also, while water cycled through geothermal wells is employed in this embodiment, other sources of natural cooling could be employed with this system. For example, cooler night-time air can be used to cool water, which could be stored in a reservoir for use during the following day. Water cooled by spraying could be used in some applications. Also, surface water from lakes or rivers may be used as a source of cooling in place of the geothermal water 18.

For most applications, the use of refrigerants or hazardous materials can be avoided. The amount of energy needed, in terms of electrical energy or fossil fuels, is significantly less than with other air conditioning systems. The maintenance and repair requirements of the geothermal desiccant cooling and dehumidification system are significantly less than those of traditional systems. This system does not require any significant amount of outdoor air, which translates into a much smaller requirement of energy for fans and blowers than is needed with other air conditioning systems. The geothermal desiccant system does not consume water, which also distinguishes it from traditional, "ventilation" type desiccant air conditioning systems. Because the system does not rely on refrigerants, either those harmful to the ozone, or their replacements, there is no need to monitor refrigerant concentrations in equipment closets or mechanical rooms, as is required for refrigerant-based systems (see ASHRAE/ANSI Standard 15). Also, because the system of this invention relies on heat, not electricity, for its operation, the system can yield a dramatic reduction in system peak power requirements, which helps avoid the need for low-efficiency, high-waste peak power generation equipment.

The efficiency of the desiccant cycle can be optimized by varying the ratios of the two split airstreams. Also, with partial load performance, the efficiency increases, an the efficiency goes up as well when the cooling water temperature drops. The desiccant cycle split airstream dehumidification of this invention can be employed in an air conditioning system that uses mechanically chilled rather than naturally chilled water.

While the invention has been described in reference to a preferred embodiment, it should be understood that the invention is not limited to that precise embodiment. Rather, many modifications and variations will present themselves to those skilled in the art without departing from the scope and spirit of the invention, as defined in the appended claims.

I claim:

1. A cooling arrangement for cooling and dehumidifying air in a conditioned space, including a return duct in which air from the conditioned space enters, a desiccant device for dehumidification of an airflow, an air-to-air heat exchanger in which air in a first pathway exchanges thermal energy with air in a second pathway therethrough, a heating element, first and second cooling coils for cooling the air and each being supplied with water from a source of cooling, and a supply air plenum from which conditioned air is sent back into the conditioned space; and wherein
    return air in said return air duct is divided and directed into separate first and second courses;
    a) wherein in said first course the return air passes through said desiccant device to remove humidity from the air, the air leaving the desiccant device passes through said first cooling coil to cool the air, and the air leaving the first cooling coil enters the supply air plenum;
    b) wherein the second course, the return air enters the first pathway through said air-to-air heat exchanger, the air leaving said first pathway is heated by said heater element and passes through said desiccant device to pick up humidity from the desiccant device, the air leaving the desiccant device passes through the second pathway through said air-to-air heat exchanger, and the air leaving the second pathway of said heat exchanger passes through said second cooling coil to cool and dehumidify the air in the second course, and the air exiting the second cooling coil passes to the supply air plenum where it mixes with the air of the first course, and then returns to the conditioned space.

2. The cooling arrangement of claim 1, wherein the water is supplied from a geothermal well and has a temperature between about 50° F. and 60° F.

3. The cooling arrangement of claim 1, wherein said regenerative air-to-air heat exchanger is a counterflow heat exchanger.

4. The cooling arrangement of claim 1, wherein said regenerative air-to-air heat exchanger is a cross-flow heat exchanger.

5. The cooling arrangement of claim 1, comprising first and second blowers situated at said return duct and forcing air respectively through said first and second courses.

6. The cooling arrangement of claim 1, comprising a blower situated at said supply plenum and drawing air through said first and second courses.

7. The cooling arrangement of claim 6, comprising first and second independently controllable dampers situated in said first and second courses, respectively.

8. The cooling arrangement of claim 1, wherein said source of natural cooling is a geothermal well, and the arrangement further comprises a supplemental chiller for removing heat from water supplied from said geothermal well.

9. The cooling arrangement of claim 8, wherein said supplemental chiller transfers heat from the water supplied from the geothermal well to water that returns to the geothermal well.

10. The cooling arrangement of claim 1, wherein said desiccant device includes a desiccant wheel.

11. A cooling arrangement for cooling and dehumidifying air in a conditioned space, including a return duct in which air from the conditioned space enters, a desiccant device adapted for dehumidifying an air stream, a heating element, first and second cooling coils for cooling the air and each being supplied with water from a source of cooling, and a supply air plenum from which conditioned air is sent back into the conditioned space; and wherein
    return air in said return air duct is divided and directed into separate first and second courses;
    a) wherein in said first course the return air passes through said desiccant device to remove humidity from the air, the air leaving the desiccant device passes through said first cooling coil to cool the air, and the air leaving the first cooling coil enters the supply air plenum;
    b) wherein the second course, the return air is heated by said heater element and passes through said desiccant device to pick up humidity from the desiccant device, the air leaving the desiccant device passes through said second cooling coil to cool and dehumidify the air in the second course, and the air exiting the second cooling coil passes to the supply air plenum where it mixes with the air of the first course, and then returns to the conditioned space.

12. The cooling arrangement of claim 11, wherein the water is supplied from a geothermal well and has a temperature between about 50° F. and 60° F.

13. The cooling arrangement of claim 11, comprising first and second blowers situated at said return duct and forcing air respectively through said first and second courses.

14. The cooling arrangement of claim 11, comprising a blower situated at said supply plenum and drawing air through said first and second courses.

15. The cooling arrangement of claim 14, comprising first and second independently controllable dampers situated in said first and second courses, respectively.

16. The cooling arrangement of claim 11, comprising a supplemental chiller for removing heat from water supplied from a source of natural cooling.

17. The cooling arrangement of claim 11, wherein waste heat from said supplemental chiller is supplied to said heater element.

18. The cooling arrangement of claim 11, wherein said desiccant device comprises a desiccant wheel.

* * * * *